(12) United States Patent
Warner et al.

(10) Patent No.: US 8,103,695 B2
(45) Date of Patent: Jan. 24, 2012

(54) CREATING STORAGE FOR XML SCHEMAS WITH LIMITED NUMBERS OF COLUMNS PER TABLE

(75) Inventors: James W. Warner, South San Francisco, CA (US); Thomas Baby, Maple Valley, WA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 804 days.

(21) Appl. No.: 12/122,589

(22) Filed: May 16, 2008

(65) Prior Publication Data
US 2009/0287719 A1  Nov. 19, 2009

(51) Int. Cl.
*G06F 7/00*  (2006.01)
*G06F 17/30*  (2006.01)

(52) U.S. Cl. ......... 707/791; 707/793; 707/796; 707/804

(58) Field of Classification Search .................. 707/791, 707/793, 796, 804
See application file for complete search history.

(56) References Cited

U.S. PATENT DOCUMENTS

| | | | |
|---|---|---|---|
| 2004/0143581 A1* | 7/2004 | Bohannon et al. | 707/100 |
| 2006/0173865 A1* | 8/2006 | Fong | 707/100 |
| 2006/0184552 A1* | 8/2006 | Meliksetian et al. | 707/101 |
| 2009/0204636 A1* | 8/2009 | Li et al. | 707/103 Y |

OTHER PUBLICATIONS

Igor Dayen, "Storing XML in Relational Databases," Jun. 20, 2001, http://www.xml.com/lpt/a/803, printed Oct. 16, 2008, 13 pages.

* cited by examiner

*Primary Examiner* — John R. Cottingham
*Assistant Examiner* — Mariela Reyes
(74) *Attorney, Agent, or Firm* — Hickman Palermo Truong & Becker LLP

(57) ABSTRACT

Techniques are described herein for automatically generating multiple interrelated database tables to store XML data, while ensuring that each such table has no more than the maximum DBMS-allowed number of columns. In response to the registration of an XML schema with a database server, the server determines whether any of the elements specified in the XML schema are complex elements that have more than a threshold number of descendant elements. If a complex element has more than the threshold number of descendant elements, then the server automatically generates one or more separate "out-of-line" database tables for storing at least some of those descendant elements, so that the table created to store the complex element will have no more than the permitted number of columns. Each of the out-of-line database tables is similarly generated so as to have no more than the permitted number of columns.

12 Claims, 3 Drawing Sheets

CREATING STORAGE FOR XML SCHEMAS WITH LIMITED NUMBERS OF COLUMNS PER TABLE

FIELD OF THE INVENTION

This relates generally to database management systems and, more specifically, to techniques for creating storage for XML schemas in database systems that limit the numbers of columns that a database table may have.

BACKGROUND

In a database management system (DBMS), data is stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database management systems retrieve information in response to receiving queries that specify the information to retrieve. In order for a database management system to understand the query, the query should conform to a database language recognized by the database management system, such as the Structured Query Language (SQL).

The data that is stored within a database table may be data that was obtained automatically from a set of similarly structured XML documents. Each XML document in a group of similarly structured XML documents may conform to a structure that is defined by a particular XML schema. A user may register the particular XML schema with a DBMS. In response to the registration of the particular XML schema with the DBMS, the DBMS may automatically read the data from each of the XML documents that conforms to the particular XML schema. The DBMS may automatically generate a database table that is capable of storing this data, and may automatically populate this database table with the data. For example, for each XML document that conforms to the particular XML schema, the DBMS may populate a separate row of a database table with at least a portion of the data that is contained in that XML document. Thus, separate rows of a database table may store data obtained from separate XML documents.

Usually, each such XML document represents data as one or more separate elements. For example, each XML document that conforms to the particular XML schema might have a "name" element, a "street" element, a "city" element, a "state" element, a "zip code" element, and a "phone number" element (although the actual data for each of these elements may vary between the XML documents). As the DBMS populates a database table with data obtained from the XML documents, the DBMS may store each element's data within a separate column in the database table. This differs from approaches in which all of the data from an XML document is stored within a single "large object" (or "LOB") column. The process of storing an XML document's separate elements in separate database table columns is called "shredding."

In an XML document, a particular element may have multiple sub-elements that are hierarchically subordinate to that particular element. For example, the "name," "street," "city," "state," "zip code," and "phone number" elements discussed in the example above might all be sub-elements of a hierarchically superior "customer contact information" element. An element that has multiple hierarchically subordinate sub-elements is a "complex element" (as opposed to a "simple element"). When the DBMS initially generates a database table to store shredded XML data from a group of XML documents, the DBMS may attempt to create the table with enough columns to store all of the sub-elements of a particular complex element. However, for practical reasons, many DBMSs have limits on the number of columns that a single database table is permitted to have. If a particular complex element has a number of sub-elements that is greater than the number of columns that a single database table is permitted to have, then the DBMS may be unable, due to constraints, to create a database table with a separate column for each of those sub-elements. Under such circumstances, the DBMS may simply inform the user that the attempt to import the schema-conforming XML documents into the database failed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
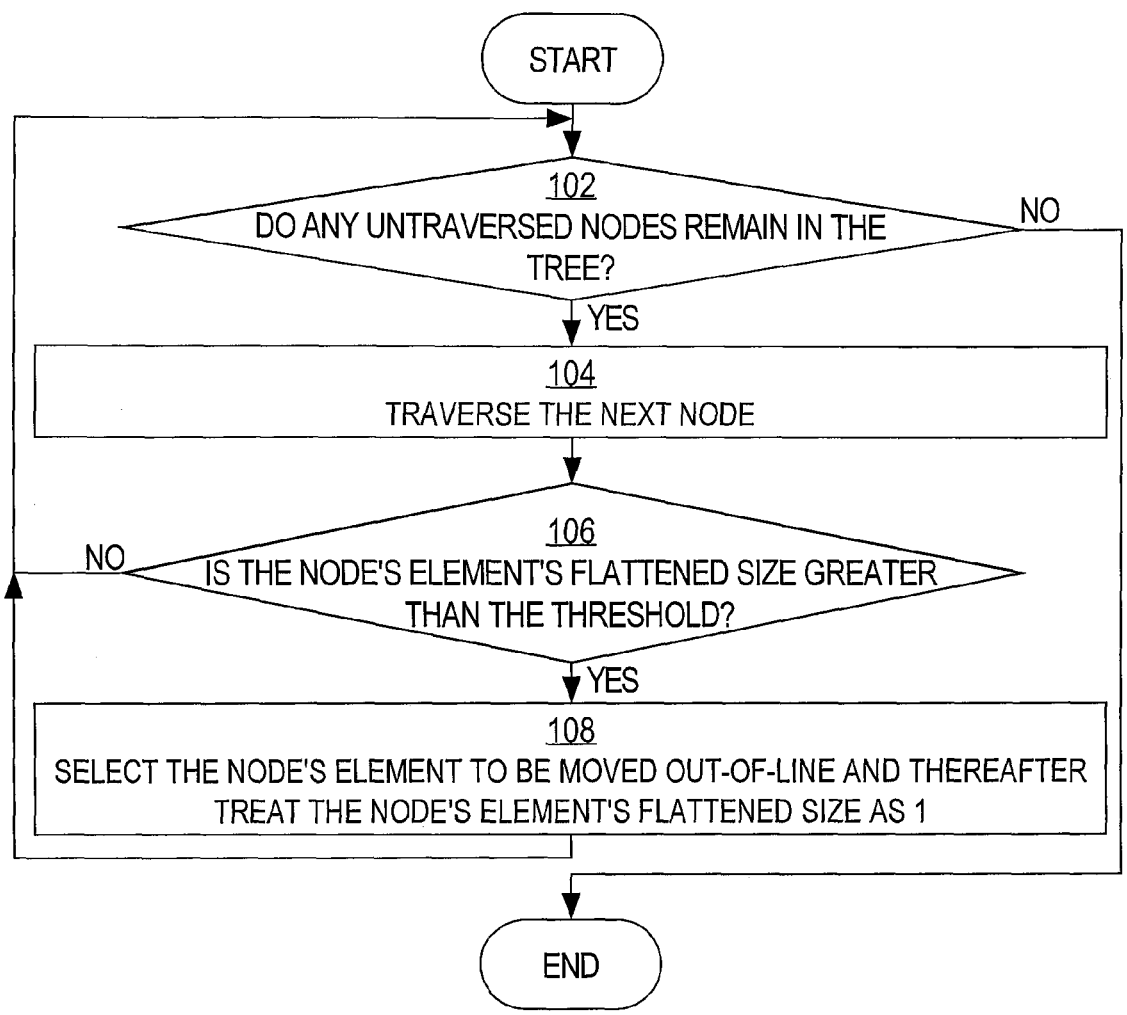
FIG. 1 is a flowchart illustrating a technique for aggressively selecting elements of an XML schema to be moved out-of-line from a parent table, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for automatically generating multiple interrelated database tables to store XML data, while ensuring that each such table has no more than the maximum DBMS-allowed number of columns. According to one such technique, in response to a user's registration of an XML schema with a database server, the database server determines whether any of the elements specified in the XML schema are complex elements that have more than a threshold number of descendant elements (i.e., sub-elements of the complex element, sub-elements of those sub-elements, and so forth). If a complex element has more than the threshold number of descendant elements, then the database server automatically generates one or more separate "out-of-line" database tables for storing at least some of those descendant elements, so that the table created to store the complex element will have no more than the permitted number of columns. Each of the out-of-line database tables is similarly generated so as to have no more than the permitted number of columns.

Under such circumstances, when the database server automatically populates the created tables with data from the XML documents that conform to the registered XML schema, the database server stores, in those tables, references between the parent table, which stores data for parent elements, and the out-of-line child tables, which store data for the child elements of those parent elements. For example, the database server may populate each row in a column of the parent table with foreign keys that refer to corresponding rows in a child table, such that, given any row in the parent table that stores data for a particular instance of a parent element, the foreign key that is stored in that row refers to a corresponding row in the child table that stores data for a child element of the particular instance of the parent element.

Various implementations of the techniques described are embodied in methods, apparatus, and in computer-readable media.

EXAMPLE XML SCHEMA AND CONFORMING XML DOCUMENT

The following is an example XML schema. The XML schema defines, among other types, a "PurchaseOrderType," which is a complex type (i.e., a type with multiple child elements), and an "SKU," which is a simple type (i.e., a non-complex type):

```
<xsd:schema xmlns:xsd="http://www.w3.org/2001/XMLSchema">
  <xsd:annotation>
    <xsd:documentation xml:lang="en">
      Purchase order schema for Example.com.
      Copyright 2000 Example.com. All rights reserved.
    </xsd:documentation>
  </xsd:annotation>
  <xsd:element name="purchaseOrder" type="PurchaseOrderType"/>
  <xsd:element name="comment" type="xsd:string"/>
  <xsd:complexType        name="PurchaseOrderType">
    <xsd:sequence>
      <xsd:element       name="shipTo"      type="USAddress"/>
      <xsd:element       name="billTo"      type="USAddress"/>
      <xsd:element       ref="comment"      minOccurs="0"/>
      <xsd:element       name="items"       type="Items"/>
    </xsd:sequence>
    <xsd:attribute       name="orderDate" type="xsd:date"/>
  </xsd:complexType>
  <xsd:complexType        name="USAddress">
    <xsd:sequence>
      <xsd:element       name="name"       type="xsd:string"/>
      <xsd:element       name="street"     type="xsd:string"/>
      <xsd:element       name="city"       type="xsd:string"/>
      <xsd:element       name="state"      type="xsd:string"/>
      <xsd:element       name="zip"        type="xsd:decimal"/>
    </xsd:sequence>
    <xsd:attribute       name="country" type="xsd:NMTOKEN"
                         fixed="US"/>
  </xsd:complexType>
  <xsd:complexType        name="Items">
    <xsd:sequence>
      <xsd:element       name="item" minOccurs="0"
        maxOccurs="unbounded">
        <xsd:complexType>
          <xsd:sequence>
            <xsd:element name="productName" type="xsd:string"/>
            <xsd:element name="quantity">
              <xsd:simpleType>
                <xsd:restriction base="xsd:positiveInteger">
                  <xsd:maxExclusive value="100"/>
                </xsd:restriction>
              </xsd:simpleType>
            </xsd:element>
            <xsd:element name="USPrice" type="xsd:decimal"/>
            <xsd:element ref="comment" minOccurs="0"/>
            <xsd:element name="shipDate" type="xsd:date"/>
```

```
              minOccurs="0"/>
          </xsd:sequence>
          <xsd:attribute name="partNum" type="SKU"
            use="required"/>
        </xsd:complexType>
      </xsd:element>
    </xsd:sequence>
  </xsd:complexType>
  <!-- Stock Keeping Unit, a code for identifying products -->
  <xsd:simpleType name="SKU">
    <xsd:restriction base="xsd:string">
      <xsd:pattern value="\d{3}-[A-Z] {2}"/>
    </xsd:restriction>
  </xsd:simpleType>
</xsd:schema>
```

XML instance documents can conform to the foregoing XML schema. The following is an example of an XML instance document that conforms to the foregoing XML schema:

```
<?xml version="1.0"?>
<purchaseOrder orderDate="1999-10-20">
  <shipTo country="US">
    <name>Alice Smith</name>
    <street>123 Maple Street</street>
    <city>Mill Valley</city>
    <state>CA</state>
    <zip>90952</zip>
  </shipTo>
  <billTo country="US">
    <name>Robert Smith</name>
    <street>8 Oak Avenue</street>
    <city>Old Town</city>
    <state>PA</state>
    <zip>95819</zip>
  </billTo>
  <comment>Hurry, my lawn is going wild!</comment>
  <items>
    <item partNum="872-AA">
      <productName>Lawnmower</productName>
      <quantity>1</quantity>
      <USPrice>148.95</USPrice>
      <comment>Confirm this is electric</comment>
    </item>
    <item partNum="926-AA">
      <productName>Baby Monitor</productName>
      <quantity>1</quantity>
      <USPrice>39.98</USPrice>
      <shipDate>1999-05-21</shipDate>
    </item>
  </items>
</purchaseOrder>
```

Flattened Size

In one embodiment of the invention, in order to determine whether child tables will need to be created in order to store a complex element's data, the database server uses a concept called "flattened size." In one embodiment of the invention, "flattened size" is defined in the following manner. The flattened size of an element of a complex type (one with at least one sub-element) is the flattened size of the complex type, unless that element is stored out-of-line. The flattened size of an element of a simple type (one with no sub-elements) is 1. The flattened size of a complex type is the sum of the flattened sizes of the child elements of that complex type, plus 1 for each attribute. The flattened size of an element stored out-of-line (that is, an element that has previously been separated into its own table) is 1.

For example, if a complex element "A" had two sub-elements "B" and "C," and if "B" was a complex element that had three simple sub-elements elements "D," "E," and "F," and if "C" was a complex element that had two simple sub-elements "G" and "H," then the database server would determine that complex element "A" required at least five columns to store instances of complex element "A" (i.e., one column for each of leaf elements "D," "E," "F," "G," and "H"). Thus, in one embodiment of the invention, the flattened size of complex element "A" would be at least 5 (unless and until complex element "A" was moved out-of-line). Additional columns might also be required to store metadata such as document order information, for example.

Aggressive Approach

In one embodiment of the invention, the database server uses an aggressive approach to determine whether to create an out-of-line child table to store a complex element's data. The elements specified in an XML schema are hierarchically organized, such that some elements are hierarchically superior to other elements. Consequently, an XML schema's specified elements can be represented as a tree of nodes, with each node representing a different element in the XML schema. According to the aggressive approach, the database server traverses this tree using postorder traversal, evaluating each node in the manner described below as that node is traversed; thus, leaf nodes of the tree are evaluated before their parent nodes are, and the root node is evaluated last of all. In one embodiment, the database server traverses the tree in response to a user's registration of the XML schema with the DBMS.

In evaluating a particular node during this traversal, the database server determines the flattened size of the element that the particular node represents. If the element's flattened size is greater than a specified threshold, then the database server selects that element to be "moved out-of-line." As is discussed in the definitions above, when the database server continues with the postorder traversal, the database server will subsequently treat the particular node's element as having a flattened size of 1, due to the decision to move the element out-of-line. In one embodiment of the invention, the specified threshold is a specified percentage of the maximum number of columns that a table is permitted to have in the DBMS. For example, the specified threshold might be selected to be 10% of the maximum number of columns.

Either after the entire tree has been traversed postorder in this manner, or while the tree is being traversed, the database server generates child tables for each element that the database server selected to be moved out-of-line. The database server generates each child table to have as least as many columns as are needed to store all of the descendant leaf elements of the element for which that table is being created (i.e., one column per descendant leaf element). One or more of these columns may serve as the child table's "primary key." The database server stores information that will cause the database server, when the database server creates the parent table of the "child table," to generate that parent table with a "foreign key" column that will refer to the "primary key" of the child table. After automatically generating the tables in this manner, the database server may populate the rows of these tables with data from the XML documents that conform to the XML schema.

Each row may be filled with a separate "instance" of the XML element that was moved out-of-line. An "instance" of an XML element is a corresponding (to that XML element) piece of data from an XML document that conforms to an XML schema. Inasmuch as several different XML documents may conform to a particular XML schema, several different instances from those XML documents may be used to populate the rows of a table created to store an element out-of-line.

FIG. 1 is a flowchart illustrating a technique for aggressively selecting elements of an XML schema to be moved out-of-line from a parent table, according to an embodiment of the invention. The steps are to be understood to be performed in the context of a postorder tree traversal of nodes that represent elements in the XML schema, as discussed above. Alternative embodiments of the invention may comprise additional, fewer, or different steps than those described below.

In block 102, the database server determines whether any untraversed nodes remain in the tree. If no untraversed nodes remain in the tree, then the technique is completed. Alternatively, if at least one untraversed node remains in the tree, then control passes to block 104.

In block 104, the database server traverses the next node using postorder traversal. In block 106, the database server determines whether the flattened size of the element that the node represents is greater than a specified threshold (e.g., 10% of the maximum permitted database table columns). If the flattened size of the element is greater than the specified threshold, then control passes to block 108. Otherwise, control passes back to block 102.

In block 108, the database server selects the element to be moved out-of-line. The database server may create an out-of-line child table for the selected element at this time, or after the remainder of the tree has been traversed. Because the element has been selected to be moved out-of-line, the element's flattened size will be treated as 1 when calculating the flattened sizes of any ancestors of the element's node in the tree. Control passes back to block 102.

This aggressive approach tends to create a greater number of child tables than the alternative approach described below, but does not require that any node of the tree be traversed more than one time. As a result, the aggressive approach is relatively fast.

Conservative Approach

The aggressive approach discussed above might create more out-of-line child tables than are strictly necessary to avoid creating a table that exceeds the DBMS's column limit. An alternative approach for selecting which elements ought to be moved out-of-line, which selects elements in a more conservative manner than that employed by the aggressive approach discussed above, is described below.

Under the conservative approach, the database server also traverses the tree using postorder traversal. The database server continues to traverse the tree until the database server locates a particular node whose element's flattened size is greater than the maximum number of table columns permitted by the DBMS. The database server then selects, for movement out-of-line, the child element of the particular node's element that has the largest flattened size among child elements of the particular node's element. As is discussed in the definitions above, the flattened size of an element that is or is going to be moved out-of-line is thereafter treated as being 1. As a result, the movement out-of-line, or selection for movement out-of-line, of the largest child element also reduces the flattened size of the particular node's element (the parent element), since by definition the flattened size of a parent element depends on the flattened sizes of that parent element's child elements.

However, under some circumstances, more than one child element of the particular node's element will need to be moved out-of-line before the flattened size of the particular node's element becomes permissibly small. Therefore, in one embodiment of the invention, each time that the database server selects a child element of the particular node's element for movement out-of-line, the database server once again determines whether the particular node's element's flattened size still exceeds the maximum number of database table columns permitted by the DBMS. If the particular node's element's flattened size still exceeds this maximum number, then the database server selects the next largest child element of the particular node's element for movement out-of-line, repeating the process described above. This largest-child-element-movement process continues repetitively until the flattened size of the particular node's element no longer exceeds the maximum number of database table columns permitted by the DBMS. After the database server determines that the flattened size of the particular node's element is acceptably small, then the database server continues with the traversal as discussed above.

Either after the entire tree has been traversed postorder in this manner, or while the tree is being traversed, the database server generates child tables for each element that the database server selected to be moved out-of-line. The database server generates each child table to have as least as many columns as are needed to store all of the descendant leaf elements of the element for which that table is being created (i.e., one column per descendant leaf element). One or more of these columns may serve as the child table's "primary key." The database server stores information that will cause the database server, when the database server creates the parent table of the "child table," to generate that parent table with a "foreign key" column that will refer to the "primary key" of the child table. After automatically generating the tables in this manner, the database server may populate the rows of these tables with data from the XML documents that conform to the XML schema.

Figure 2:
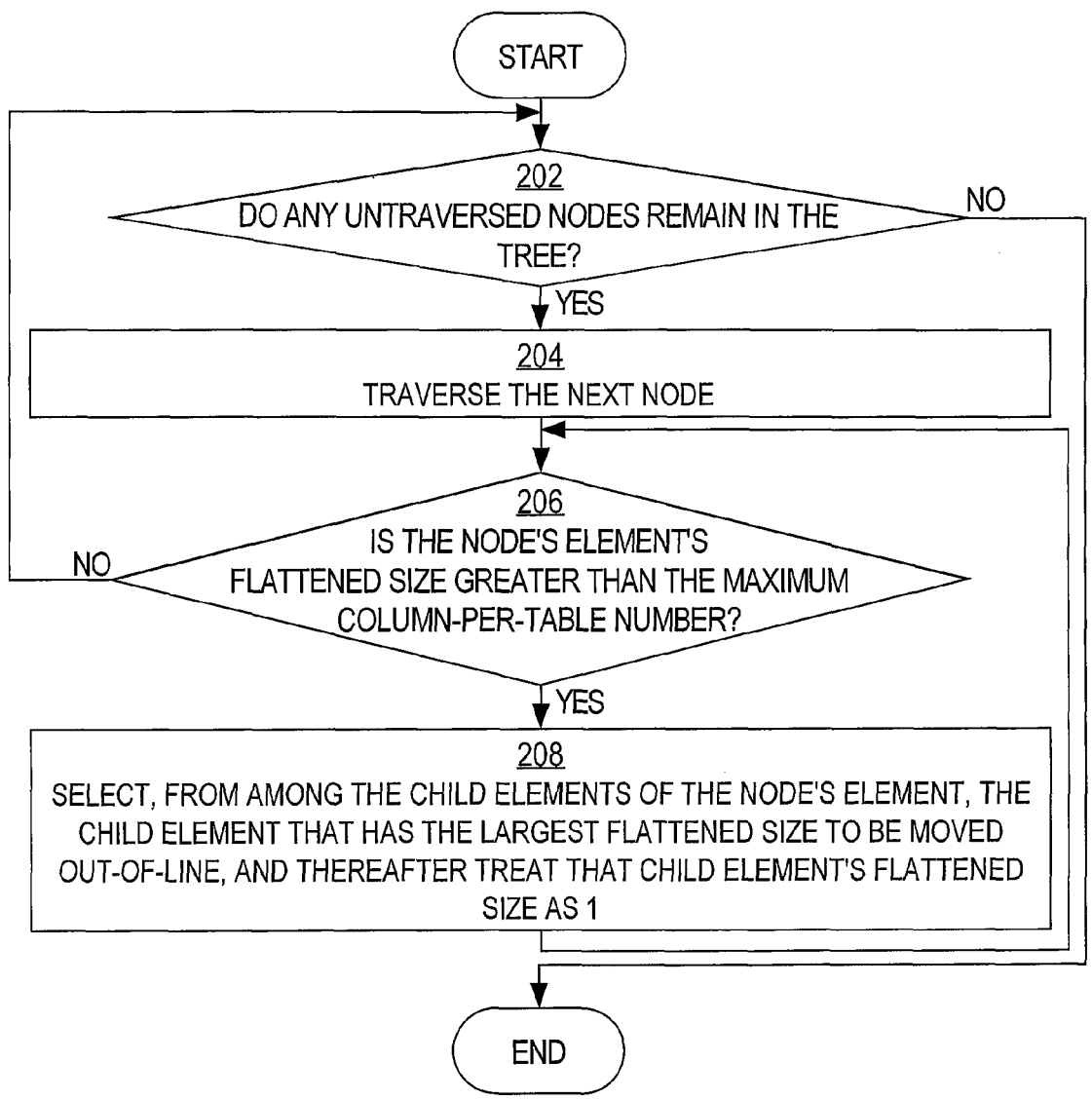
FIG. 2 is a flowchart illustrating a technique for conservatively selecting elements of an XML schema to be moved out-of-line from a parent table, according to an embodiment of the invention.

FIG. 2 is a flowchart illustrating a technique for conservatively selecting elements of an XML schema to be moved out-of-line from a parent table, according to an embodiment of the invention. The steps are to be understood to be performed in the context of a postorder tree traversal of nodes that represent elements in the XML schema, as discussed above. Alternative embodiments of the invention may comprise additional, fewer, or different steps than those described below.

In block 202, the database server determines whether any untraversed nodes remain in the tree. If no untraversed nodes remain in the tree, then the technique is completed. Alternatively, if at least one untraversed node remains in the tree, then control passes to block 204.

In block 204, the database server traverses the next node using postorder traversal. In block 206, the database server determines whether the flattened size of the particular element that the node represents is greater than the maximum number columns that the DBMS permits to a database table to have. If the flattened size of the particular element is greater than the maximum number, then control passes to block 208. Otherwise, control passes back to block 202.

In block 208, the database server selects the largest child element (i.e., the child element that has the largest flattened size of child elements of the particular element) of the particular element to be moved out-of-line. The database server may create an out-of-line child table for the selected largest child element at this time, or after the remainder of the tree has been traversed. Because the child element has been selected to be moved out-of-line, the selected child element's flattened size will be treated as 1 when calculating the flattened sizes of any ancestors of the child element's node in the tree (including the particular element). Control passes back to block 206, in which the newly reduced flattened size of the particular element is again compared to the permissible maximum.

Reusing Child Tables for Elements of the Same Type

It is possible for two or more XML elements, specified at various locations in an XML schema, to be of the same complex type. In one embodiment of the invention, instead of creating a new separate child table every time that the database server determines that an element is to be moved out-of-line, the database server first determines whether a child table that is capable of storing instances of that element's complex type has already been created. If such a child table already has been created, then the database server does not create a new separate child table for the element that is to be moved out-of-line. Instead, the database server stores the XML data of that element in the existing child table that is capable of storing instances of that element's complex type.

In one embodiment of the invention, in order to accomplish the above, whenever the database server decides to move a particular element out-of-line, the database server first determines whether the particular element's element name and element type are already contained in a specified data structure. The specified data structure may be implemented as a linked list or hash table, for example. If the database server determines that the particular element's element name and type are not already contained in the specified data structure, then the database server creates a new child table for storing the particular element's XML data, and adds the particular element's (a) element name, (b) element type, and (c) table name (i.e., the name of the child table just created) to the database structure. Alternatively, if the database server determines that the particular element's element name and type are already contained in the specified data structure, then the database server does not create a new child table for storing the particular element's XML data; instead, the database server stores the particular element's XML data in the existing table that is already associated with the particular element's name and type in the specified data structure.

Additionally, in one embodiment of the invention, if the conservative approach discussed above is being used, then, instead of moving the child element with the largest flattened size out-of-line before moving any other child elements out-of-line, the database server first moves out-of-line (without creating new child tables) all child elements whose element names and types are already in the specified data structure discussed above. After moving these child elements out-of-line, the database server then follows the conservative technique described above relative to any remaining child element if the parent element of those child elements still has a flattened size that is greater than the maximum number of columns-per-table permitted by the DMBS.

Hardware Overview

Figure 3:
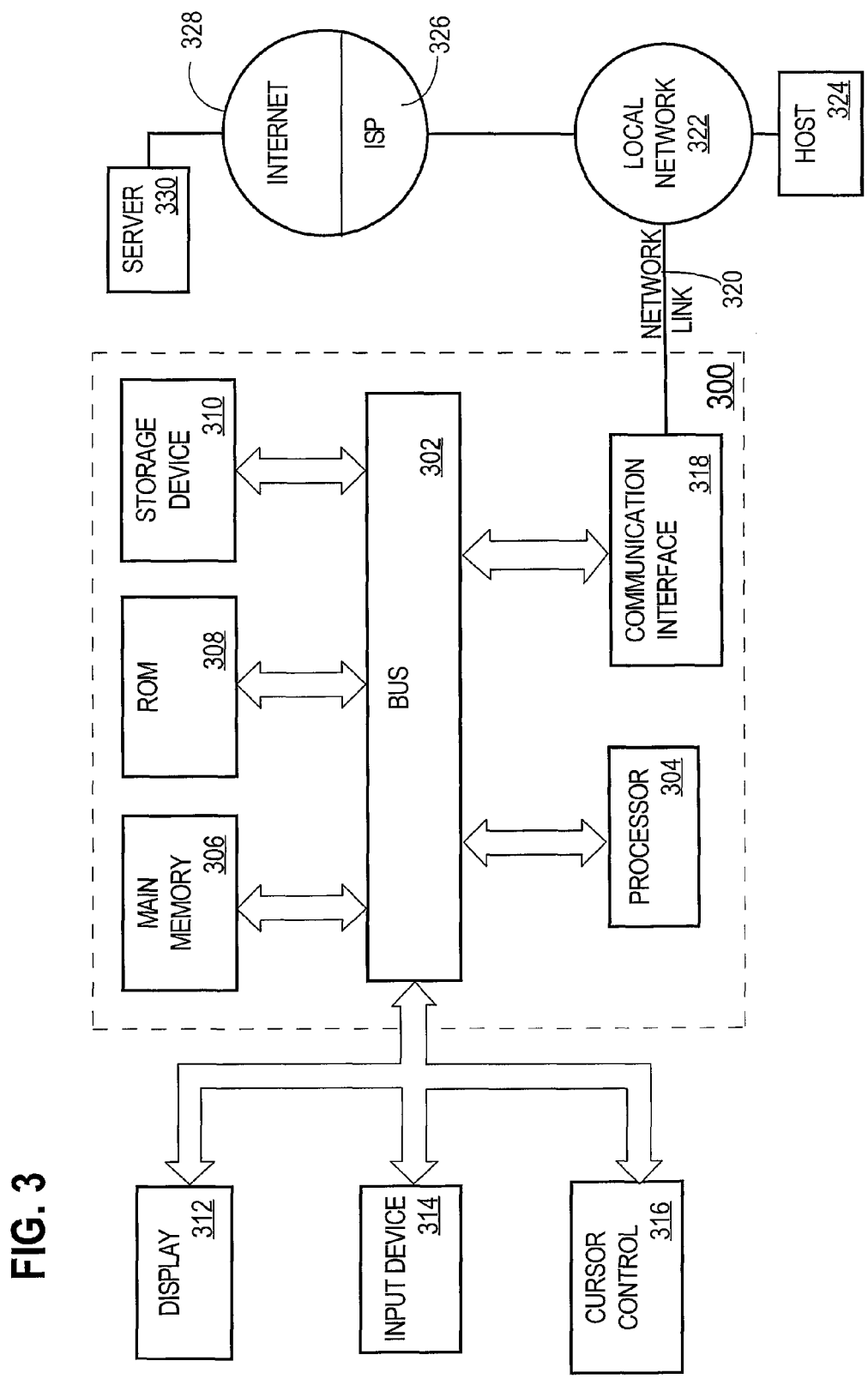
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "machine-readable medium" and "computer-readable medium" as used herein refer to any medium that participates in providing data that causes a machine or computer, respectively, to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. The terms "machine-readable storage medium" and "computer-readable storage medium" refer to volatile and non-volatile media upon which data can be stored. Transmission media includes coaxial cables, copper wire and fiber optics, including the wires that comprise bus 302. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use a transmitter to convert the data to a signal. A detector can receive the data carried in the signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:

in response to determining that a database table that will be generated to store instances of a particular Extensible Markup Language (XML) element specified in a particular XML schema will have more than a specified maximum number of columns-per-table permitted by a database management system (DBMS), traversing, using postorder traversal, a tree that represents a structure of the particular XML schema;

in response to determining, at a particular node of the tree traversed, that a flattened size of an XML element that corresponds to the particular node is greater than a specified threshold, selecting the XML element that corresponds to the particular node to be moved out-of-line;

in response to selecting the XML element that corresponds to the particular node to be moved out-of-line, generating a particular child database table to store instances of the XML element that corresponds to the particular node if a child database table to store instances of the XML element that corresponds to the particular node does not already exist; and automatically generating a parent database table to store instances of an element that contains the XML element, excluding instances of the XML element;

wherein the particular child database table is separate from the parent database table;

wherein the step of generating the particular child database table comprises storing, on a non-transitory computer-readable storage medium, data that defines the particular child database table.

2. The method of claim 1, wherein the specified threshold is a specified percentage of the specified maximum number of columns-per-table.

3. The method of claim 1, further comprising:

in response to selecting the XML element that corresponds to the particular node to be moved out-of-line, determining that a child table that is capable of storing instances of XML elements that are of a same type as the XML element that corresponds to the particular node has already been generated; and generating the particular child database table to store instances of the XML element that corresponds to the particular node only in response to determining that a child table that is capable of storing instances of XML elements that are of a same type as the XML element that corresponds to the particular node has not already been generated.

4. A computer-implemented method comprising:

in response to determining that a database table that will be generated to store instances of a particular Extensible Markup Language (XML) element specified in a particular XML schema will have more than a specified maximum number of columns-per-table permitted by a database management system (DBMS), traversing, using postorder traversal, a tree that represents a structure of the particular XML schema;

in response to determining, at a particular node of the tree traversed, that a flattened size of an XML element that corresponds to the particular node is greater than the specified maximum number of columns-per-table, selecting, from among child elements of the XML element that corresponds to the particular node, a largest child element with a largest flattened size to be moved out-of-line;

in response to selecting the largest child element to be moved out-of-line, generating a particular child database table to store instances of the largest child element;

automatically generating a parent database table to store instances of an element that contains the largest child element, excluding instances of the largest child element;

wherein the particular child database table is separate from the parent database table;

wherein the step of generating the particular child database table comprises storing, on a non-transitory computer-readable storage medium, data that defines the particular child database table.

5. The method of claim 4, further comprising:

after selecting the largest child element to be moved out-of-line, treating a flattened size of the largest child element as being 1 for purposes of determining a revised flattened size of the XML element that corresponds to the particular node, wherein the revised flattened size of the XML element that corresponds to the particular node is based at least in part on the flattened size of the largest child element;

determining the revised flattened size of the XML element that corresponds to the particular node;

in response to determining that the revised flattened size of the XML element that corresponds to the particular node is still greater than the specified maximum number of columns-per-table, selecting, from among not-yet-moved-out-of-line child elements of the XML element that corresponds to the particular node, a next largest child element to be moved out-of-line; and in response to selecting the next largest child element node to be moved out-of-line, generating a second child database table to store instances of the next largest child element;

wherein the second child database table is separate from the parent database table.

6. A computer-implemented method comprising:

in response to determining that a database table that will be generated to store instances of a particular Extensible Markup Language (XML) element specified in a particular XML schema will have more than a specified maximum number of columns-per-table permitted by a database management system (DBMS), traversing, using postorder traversal, a tree that represents a structure of the particular XML schema;

in response to determining, at a particular node of the tree traversed, that a flattened size of an XML element that corresponds to the particular node is greater than the specified maximum number of columns-per-table, and that there already exists a particular child database table that is capable of storing instances that are of a same type as a particular child element of the XML element that corresponds to the particular node, selecting the particular child element of the XML element that corresponds to the particular node to be moved out-of-line without creating a new child database table to store instances of the particular child element of the XML element that corresponds to the particular node;

automatically generating a parent database table to store instances of the XML element that corresponds to the particular node, excluding instances of the particular child element of the XML element that corresponds to the particular node;

wherein the particular child database table is separate from the parent database table;

wherein data that defines the particular child database table is stored on a non-transitory computer-readable storage medium.

7. A non-transitory computer-readable storage medium storing instructions which, when performed by one or more processors, cause the one or more processors to perform steps comprising:

in response to determining that a database table that will be generated to store instances of a particular Extensible Markup Language (XML) element specified in a particular XML schema will have more than a specified maximum number of columns-per-table permitted by a database management system (DBMS), traversing, using postorder traversal, a tree that represents a structure of the particular XML schema;

in response to determining, at a particular node of the tree traversed, that a flattened size of an XML element that corresponds to the particular node is greater than a specified threshold, selecting the XML element that corresponds to the particular node to be moved out-of-line;

in response to selecting the XML element that corresponds to the particular node to be moved out-of-line, generating a particular child database table to store instances of the XML element that corresponds to the particular node if a child database table to store instances of the XML element that corresponds to the particular node does not already exist; and automatically generating a parent database table to store instances of an element that contains the XML element, excluding instances of the XML element;

wherein the particular child database table is separate from the parent database table;

wherein the step of generating the particular child database table comprises storing, on a particular non-transitory computer-readable storage medium, data that defines the particular child database table.

8. The non-transitory computer-readable storage medium of claim 7, wherein the specified threshold is a specified percentage of the specified maximum number of columns-per-table.

9. The non-transitory computer-readable storage medium of claim 7, wherein the steps further comprise:

in response to selecting the XML element that corresponds to the particular node to be moved out-of-line, determining that a child table that is capable of storing instances of XML elements that are of a same type as the XML element that corresponds to the particular node has already been generated; and generating the particular child database table to store instances of the XML element that corresponds to the particular node only in response to determining that a child table that is capable of storing instances of XML elements that are of a same type as the XML element that corresponds to the particular node has not already been generated.

10. A non-transitory computer-readable storage medium storing instructions which, when performed by one or more processors, cause the one or more processors to perform steps comprising:

in response to determining that a database table that will be generated to store instances of a particular Extensible Markup Language (XML) element specified in a particular XML schema will have more than a specified maximum number of columns-per-table permitted by a database management system (DBMS), traversing, using postorder traversal, a tree that represents a structure of the particular XML schema;

in response to determining, at a particular node of the tree traversed, that a flattened size of an XML element that corresponds to the particular node is greater than the specified maximum number of columns-per-table, selecting, from among child elements of the XML element that corresponds to the particular node, a largest child element with a largest flattened size to be moved out-of-line;

in response to selecting the largest child element to be moved out-of-line, generating a particular child database table to store instances of the largest child element;

automatically generating a parent database table to store instances of an element that contains the largest child element, excluding instances of the largest child element;

wherein the particular child database table is separate from the parent database table;

wherein the step of generating the particular child database table comprises storing, on a particular non-transitory computer-readable storage medium, data that defines the particular child database table.

11. The non-transitory computer-readable storage medium of claim 10, wherein the steps further comprise:

after selecting the largest child element to be moved out-of-line, treating a flattened size of the largest child element as being 1 for purposes of determining a revised flattened size of the XML element that corresponds to the particular node, wherein the revised flattened size of the XML element that corresponds to the particular node is based at least in part on the flattened size of the largest child element;

determining the revised flattened size of the XML element that corresponds to the particular node;

in response to determining that the revised flattened size of the XML element that corresponds to the particular node is still greater than the specified maximum number of columns-per-table, selecting, from among not-yet-moved-out-of-line child elements of the XML element that corresponds to the particular node, a next largest child element to be moved out-of-line; and in response to selecting the next largest child element node to be moved out-of-line, generating a second child database table to store instances of the next largest child element;

wherein the second child database table is separate from the parent database table.

12. A non-transitory computer-readable storage medium storing instructions which, when performed by one or more processors, cause the one or more processors to perform steps comprising:

in response to determining that a database table that will be generated to store instances of a particular Extensible Markup Language (XML) element specified in a particular XML schema will have more than a specified maximum number of columns-per-table permitted by a database management system (DBMS), traversing, using postorder traversal, a tree that represents a structure of the particular XML schema;

in response to determining, at a particular node of the tree traversed, that a flattened size of an XML element that corresponds to the particular node is greater than the specified maximum number of columns-per-table, and that there already exists a particular child database table that is capable of storing instances that are of a same type as a particular child element of the XML element that corresponds to the particular node, selecting the particular child element of the XML element that corresponds to the particular node to be moved out-of-line without creating a new child database table to store instances of the particular child element of the XML element that corresponds to the particular node;

automatically generating a parent database table to store instances of the XML element that corresponds to the particular node, excluding instances of the particular child element of the XML element that corresponds to the particular node;

wherein the particular child database table is separate from the parent database table;

wherein data that defines the particular child database table is stored on a particular non-transitory computer-readable storage medium.

* * * * *

UNITED STATES PATENT AND TRADEMARK OFFICE
CERTIFICATE OF CORRECTION

| | | |
|---|---|---|
| PATENT NO. | : 8,103,695 B2 | Page 1 of 1 |
| APPLICATION NO. | : 12/122589 | |
| DATED | : January 24, 2012 | |
| INVENTOR(S) | : Warner et al. | |

It is certified that error appears in the above-identified patent and that said Letters Patent is hereby corrected as shown below:

In column 5, line 51, delete "as least" and insert -- at least --, therefor.

In column 7, line 26, delete "as least" and insert -- at least --, therefor.

Signed and Sealed this
Tenth Day of April, 2012

David J. Kappos
*Director of the United States Patent and Trademark Office*